United States Patent [19]

Fant et al.

[11] Patent Number: 5,561,484
[45] Date of Patent: Oct. 1, 1996

[54] METHOD AND APPARATUS FOR CONTROLLING EXPOSURE FORMAT

[75] Inventors: Alfred B. Fant, Greece; William T. Rochford, Rochester, both of N.Y.

[73] Assignee: Eastman Kodak Company, Rochester, N.Y.

[21] Appl. No.: 275,201

[22] Filed: Jul. 14, 1994

[51] Int. Cl.⁶ .......................... G03B 17/24; G03B 13/12; G03B 17/26
[52] U.S. Cl. .......................... 396/60; 396/435; 396/436; 396/207
[58] Field of Search ............................ 354/21, 106, 159, 354/222, 275, 94; 352/78 C

[56] References Cited

U.S. PATENT DOCUMENTS

| | | | |
|---|---|---|---|
| Re. 32,797 | 12/1988 | Harvey | 354/481 |
| 3,490,844 | 1/1970 | Sapp | 355/40 |
| 4,357,102 | 11/1982 | Taren et al. | 355/77 |
| 4,597,654 | 7/1986 | Harvey et al. | 354/21 |
| 4,650,304 | 3/1987 | Harvey | 354/21 |
| 4,678,299 | 7/1987 | Harvey | 354/21 |
| 4,678,300 | 7/1987 | Beach | 354/21 |
| 4,975,732 | 12/1990 | Robison et al. | 355/40 |
| 5,006,873 | 4/1991 | Wash | 354/106 |
| 5,032,707 | 7/1991 | Gudmundson et al. | 235/375 |
| 5,132,715 | 7/1992 | Taillie | 354/105 |
| 5,140,353 | 8/1992 | Stoneham | 354/105 |
| 5,142,310 | 8/1992 | Taniguchi et al. | 354/106 |
| 5,170,198 | 12/1992 | Cannon | 354/105 |
| 5,258,790 | 11/1993 | Tanaka | 354/94 |
| 5,389,983 | 2/1995 | Tsunefuji et al. | 354/21 |
| 5,440,363 | 8/1995 | Minnick et al. | 354/21 |

*Primary Examiner*—A. A. Mathews
*Attorney, Agent, or Firm*—Peter J. Bilinski

[57] ABSTRACT

A photographic element cassette is encoded with format information (CEFI) for automatically configuring a compatible variable format camera in a selected format. According to the invention, the cassette is provided with a camera readable feature encoded with a selected exposure format that automatically sets and maintains the camera for the selected exposure format. A variable format photographic camera is also provided for use with the CEFI encoded cassette, having features responsive to the CEFI code on the cassette so that the encoded format is automatically set and maintained as long as the cassette is in the camera. A method for controlling the exposure of an entire roll of a photographic element with a consistent format in a variable format camera with or without mid roll interruption is also preferably provided.

24 Claims, 6 Drawing Sheets

METHOD AND APPARATUS FOR CONTROLLING EXPOSURE FORMAT

FIELD OF THE INVENTION

This invention relates generally to a film magazine or cassette that can automatically configure a compatible camera to expose photographic images in a predetermined format, and more particularly to film cassettes having cassette encoded format information (CEFI), for use in a camera using the film cassettes, decoding the format information and setting the format of exposures made on film carried by the cassettes while a cassette is in the camera and to a method for controlling the exposure format.

BACKGROUND OF THE INVENTION

Both amateur and professional photographers have long sought cameras that enable them to take photographs in a variety of formats that are appropriate for a particular photograph being taken. Professional photographers often carry two or more cameras that are equipped with special lenses for separately taking telephoto and wide angle photographs, for example. Moreover, with the advent of new methods for viewing photographs, such as Photo CD, which enables photographs to be transferred to compact disk read only memory and viewed on television sets or video monitors, even more formats are needed. Still further in the future, as high definition television (HDTV), becomes more common a still further format may be required.

A standard 35 mm exposure is about 24 mm high and 36 mm wide, and hence has an aspect ratio of 1.5:1. HDTV, however, displays images with an aspect ratio of 1.75:1 while recently introduced panoramic prints having an aspect ratio of 2.75:1 or more have also become popular. Therefore, there is a need for a camera that can expose film in all of these formats.

In commonly assigned U.S. Pat. Nos. 4,678,299 and RE 32,797, a camera is described that enables pseudo telephoto and pseudo panoramic prints to be produced from a camera having a zoom objective lens that is adjustable to vary its angular field of view within a field range having wide angle limit, i.e. 28 mm. and a moderate telephoto limit, i.e. 80 mm. The pseudo telephoto and pseudo panoramic formats exceed these built-in limits. The lens is combined with a masking unit in the viewfinder to provide various masking configurations in the finder field to frame a selected portion of a subject to be photographed. The format of the respective masking configurations of the masking unit correspond to the pseudo telephoto and pseudo panoramic format settings of the camera. When the masking unit is activated in accordance with the respective pseudo telephoto and pseudo panoramic settings, the masking unit is rendered opaque to partially mask the finder field to various degrees. Thus, the particular pseudo telephoto or pseudo panoramic format associated with the selected setting of the camera may be viewed in the non-masked portion of the view-finder field.

In another arrangement, and in place of the masking unit, a finder lens in the viewfinder is provided which is adjustable to change its angular field of view to respective telephoto fields that define the pseudo telephoto formats. As a result, a selected pseudo telephoto format can be viewed in the full field of the viewfinder, rather than in a non-masked portion of the finder field. This enables the viewfinder to show a full natural size image of the subject to be photographed, allowing the view through the viewfinder to be on the same scale as the view made with the unaided eye.

Several methods for changing the format of an exposure by masking the exposure plane of the camera with an adjustable feature are also known in the art. The format varying mechanism typically comprises a rectangularly-shaped aperture frame for defining a standard format image area on a standard format film, and a masking means for partly covering the rectangularly-shaped aperture frame so as to define a panoramic format image area on the standard format film which is more elongated in size than the standard format image area. For example, U.S. Pat. No. 5,258,790 discloses a variable format camera having a retractable lens which further provides a mechanism for setting the format between .a standard format and a panoramic format. The panoramic format is achieved by manually causing opposing opaque blades or shields to cover the upper and lower portions of the film plane. The resulting rectangular opening is thus set with the selected aspect ratio corresponding to a panoramic format.

It is desirable to control the exposure of the photographic element in accordance with the amount of light reaching the unmasked portion of the photographic element. Thus, the portion of the film frame used to produce the pseudo print can be more accurately exposed. RE 32,797 discloses an exposure control system incorporating a photocell in which the amount of light reaching the photocell is controlled in accordance with the position of the format setting means; for example, a manually set zoom lens. Thus, the portion of the film frame covered by the selected pseudo field of view is exposed in proportion to the amount of light available to the area with the selected format.

Because pseudo format exposures are physically identical to normal exposures; that is, the exposure is made on the same film, such as 35 mm film, it is necessary to identify both that pseudo format exposures are present on the film cartridge so that the cartridge receives special handling, and more particularly to identify the format of the individual exposures so that they can be printed in the selected format.

Commonly assigned U.S. Pat. No. 4,650,304 discloses a camera adapted to receive a special film cartridge for taking exposures for use in producing pseudo telephoto and/or pseudo panoramic prints. The special cartridge is distinguishable physically from a conventional cartridge, preferably by an absence of the spool extension which projects from one end of the conventional cartridge. This enables the special cartridge to be identified for routing at the photo finisher to corresponding equipment for producing pseudo telephoto and pseudo panoramic prints. With the special cartridge, there cannot be any failure by the photo finisher to identify the cartridge as one containing film on which exposures have been made for use in producing pseudo format prints.

U.S. Pat. No. 4,678,300 discloses a film cartridge having a unique indicator arranged within a discrete dedicated area on an exterior surface of the cartridge. The indicator may be physically altered by a corresponding member in the pseudo format camera to provide a visible indication that the cartridge was used in the pseudo format camera. Preferably, the indicator means is a light reflecting material which is disfigured by a striker mounted on the back door of the pseudo format camera. The disfigured material will scatter reflected light thereby providing an automatically determinable indication to the photo finisher that the cartridge was used in a pseudo format camera.

In both of the inventions just discussed, the pseudo format camera is used with a special cartridge; that is, a film cartridge which is different from a conventional cartridge. In U.S. Pat. No. 4,678,299, apparatus is described for identifying conventional cartridges used in a particular type camera, such as a pseudo format camera. A back door of the camera is supported for closing movement to cover a film cartridge received in a loading chamber, and for opening movement to permit the received cartridge to be removed in axial direction from the back chamber. An encoding means is mounted on the back door and has a finite range of influence within which range the received cartridge is encoded with a detectable code mark to identify the cartridge to the photo finisher as one that was exposed in the pseudo format camera. Preferably, the encoding means is a magnet for magnetizing a macroscopic region of the received cartridge to encode the cartridge with a macroscopic magnetic field having a predetermined orientation. The magnet moves with the back door towards the received cartridge at least until the cartridge is within the finite range of the magnet to encode the cartridge with the macroscopic magnetic field. The encoded magnetic field will provide an automatically determinable indication to the photo finisher that the cartridge was used in a pseudo format camera.

In pseudo format cameras of the type just described, it is necessary not only to indicate to the photo finisher that a cartridge contains images exposed in a pseudo format, but moreover to identify the format in which each individual image was exposed. U.S. Pat. No. 5,140,353 describes apparatus in a simple low cost camera for encoding predetermined pseudo formats of exposed image frames on film of the type having a magnetic layer thereon in which there is a data track recorded on the film. A user operable selector on the camera is set to establish the format of an image frame to be exposed on the film. In response to the selector means, a magnetic erasure means is activated by an eraser encodement signal generating means to selectively erase predetermined portions of a segment of the data track associated with a corresponding pseudo format exposed image frame. Means are provided for inhibiting activation of the erasure means when the film is advanced in the camera in a direction opposite to the direction associated with frame by frame advance during picture taking.

U.S. Pat. No. 5,170,198 describes apparatus in a simple low cost camera for encoding the existence of pseudo format image exposures on film having a magnetic layer thereon with prerecorded data and one or more parallel tracks on the film. User operable means on the camera establish the existence of a pseudo telephoto or pseudo panoramic image frame, and actuates one or more permanent magnets into contact with one or more prerecorded data tracks on the magnetic recording layer to cause selective erasure of track segments on the film associated with the pseudo format film image frame as the film is advanced to the next frame position. The absence of data in the track segments provides an indication on the film of a desired pseudo format which can be detected by the printer during the photofinishing process to produce the appropriate pseudo format print.

U.S. Pat. No. 5,132,715 discloses a method for use with a low cost camera for encoding magnetic data tracks to determine film utilization. This is accomplished by selective magnetic field erasure of a prerecorded data track each time the film is advanced after exposure of an image frame. A magnetic read head responds to the absence of any data in the segment of track when the film is advanced.

U.S. Pat. Nos. 3,490,844 and 4,975,372 each describe systems for using encoded film on photofinishing equipment for printing in a desired format.

While the foregoing patents provide a way to expose, identify and process various pseudo formats to provide photographers with the ability to take photographs having the formats they desire, they all increase the complexity of film processing and therefore increase the cost of making prints. Not only must the film cassettes having pseudo formats be identified on a cassette by cassette basis, but the individual frames must be examined to determine the format used to expose each frame. This greatly slows the processing of the film, because masks must be set during printing to select the portion of the exposed frame indicated by the pseudo format information, the degree of enlargement must be adjusted on a frame by frame basis to provide the necessary telephoto or pseudo panoramic formats. While it is possible that this may be done automatically with suitable processing equipment, even automatic sensing and adjustment of the printing equipment to produce the desired prints from pseudo format information encoded on the cassettes and individual film frames slows the printing process, and therefore makes it more expensive.

There is a need for a way in which photographers can expose film in a variety of formats with one format for each cassette and identify the format on the cassette to permit the film to be processed in batches, at high speeds, and therefore at low cost.

SUMMARY OF INVENTION

Briefly stated, and in accordance with one aspect of the invention, a photographic element cassette encoded with format information (CEFI) for automatically configuring at compatible variable format camera in a selected format includes a film cassette, a photographic element with at least one light sensitive layer thereon contained in the cassette for exposure in a single format throughout the entire element, and a camera readable feature on the cassette encoded with a selected exposure format which feature is positioned on the cassette to engage a sensor in the camera in a manner that automatically sets and maintains the camera for the selected exposure format, as long as the cassette is in the camera.

In accordance with a further aspect of this invention, the photographic element further comprises a magnetic recording layer on a filmstrip wound within the cassette. The film is provided with means, such as a pre-recorded magnetic track, for recording the extent of film utilization so that exposure of the film can be interrupted prior to full utilization of the film (mid-roll interrupt), so that the filmstrip can be rewound into the cassette and removed from the camera for later use.

In accordance with another aspect of this invention, a variable format photographic camera for use with a compatible CEFI encoded cassette of the invention containing a photographic element is provided with sensing means for sensing the CEFI codes on the cassette while the cassette is in the camera, controlling means connected to the sensing means for controlling the format set up of the camera responsive to the CEFI code on the cassette so that the encoded format is automatically set, and format setting means connected to the controlling means for setting and maintaining the format set up of the camera for the selected format for as long as the cassette is in the camera.

In a preferred embodiment of the camera of the invention, the format setting means includes one or more moveable opaque screens for masking the film, which are located in the camera aperture in front of the exposure plane of the camera.

In another preferred embodiment of the camera of the invention, the format setting means include a plurality of light emitting diodes (LED's) located along a leading latitudinal edge of the frame member surrounding the aperture of the camera over which the advancing film passes, whereby in response to the CEFI encoded cassette sets of the LED's are energized, for exposing and fogging rows of film within a finite range of influence of the set so that the unexposed area of each film frame has the selected format.

The method and apparatus of this invention allows photographers to select an attractive format for individual exposures by inserting a suitably encoded cassette containing a photographic element into a variable format camera whereupon the camera automatically sets and maintains the selected exposure format, while the cassette is in the camera. Partially exposed rolls of film can be rewound and removed from the camera for later use. The mid-roll interrupt feature ensures that frames are not accidentally double exposed when the cassette is reloaded in a compatible camera.

An advantageous aspect of the present invention is that cassettes encoded with CEFI contain a multiplicity of exposures, all of which have the same format. The encoded cassette and exposed film can therefore be processed in a continuous high speed processor without the need for determining the format of individual frames on a frame-by-frame basis during processing. Different format exposures can be obtained by inserting other cassettes encoded for a different format into the camera. Having the entire photographic element unit exposed with a consistent format minimizes the number of changes and interruptions for a photofinisher and increases productivity over current frame-by-frame changes of printer set up.

Accordingly, this invention provides the advantages of variable format and selectable pseudo format exposure with the low cost of batch processing of single format film.

The novel aspects of this invention are set forth with particularity in the appended claims. The invention itself, together with further objects and advantages thereof may be more fully comprehended by reference to the following detailed description of a presently preferred embodiment of the invention taken in conjunction with the accompanying drawings.

BRIEF DESCRIPTION OF THE DRAWINGS

FIG. 14(*a*) is a perspective view of a CEFI cassette with a readable mechanical feature; and FIG. 14(*b*) is a rear perspective view of a camera depicting mechanical sensors for reading the film mechanical feature of the film cassette of FIG. 14(*a*).

DETAILED DESCRIPTION OF THE INVENTION

Although different film size cameras can incorporate the methods and apparatus of this invention, the invention is disclosed as being embodied preferably in a cassette for use with a 35 mm still picture camera. Because such a cassette and camera are well known, this description is directed in particular to photographic elements forming part of or cooperating directly with the disclosed embodiment. It is to be understood, however, that other elements not specifically shown or described may take various forms known to persons of ordinary skill in the art.

Figure 1:
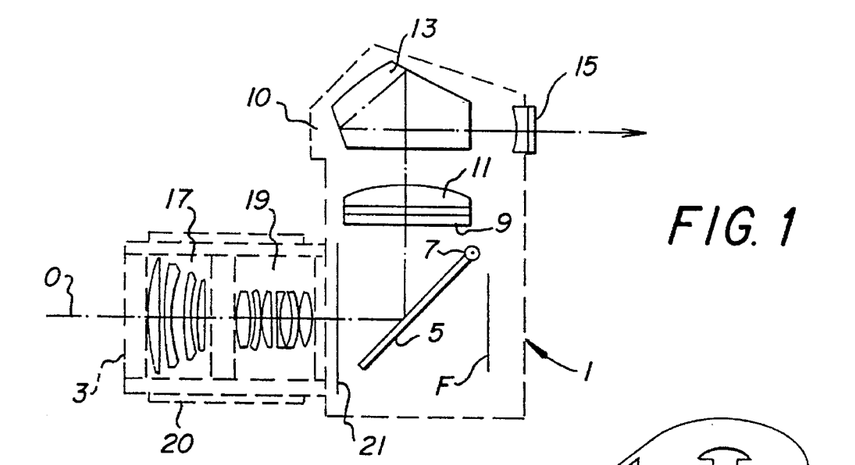
FIG. 1 is a side elevation view of a single lens reflex camera (SLR) adapted to receive a CEFI cassette.

Referring now to the drawings, and in particular to FIG. 1, there is shown a single-lens reflex (SLR) 35 mm camera 1. The camera 1 includes an objective lens 3 for focusing an image of a subject being photographed on a frame section F of film in a camera. Conventional means, such as a pressure plate and a pair of mils, not shown, support the film frame F in the focal plane of the objective lens 3 to take an exposure. A flip-up mirror 5 is located between the objective lens 3 and the film frame F. The mirror 5 is normally disposed at an angle of about 45°, and centered on the optical axis O of the objective lens 3, but can flip up about a pivot pin 7 to lie flat. When the mirror 5 is disposed at the 45° angle, it reflects the rays of light that come through the objective lens 3 onto a ground glass screen 9 in a viewfinder 10 of the camera 1. A field lens 11 and a penta-roof prism 13 in the viewfinder 10 direct the light rays through an eye lens 15 at the rear of the camera 1 to enable the subject to be photographed to be viewed through the objective lens 3. The prism 13 has three reflecting surfaces which turn the image formed by the objective lens 3 on the ground glass screen 9 upright as well as oriented in the object plane. When the mirror 5 is flipped up to lie flat, it covers the underside of the ground glass screen 9 and the light rays from the objective lens 3 fall on the film frame F. The position of the mirror 5 is so arranged that when an image of the subject to be photographed is focused on the ground glass screen 9, with the mirror at the 45° angle, the same image falls into focus on the film frame F when the mirror is flipped out of the way. Finger pressure against a shutter release, not shown, on the outside of the body of the camera 1 flips the mirror 5 up. At first the light rays fall only on the blind of a focal plane shutter, not shown, but as the mirror 5 reaches the upper limit of its travel, it presses against it stop which releases the shutter blades to make the exposure.

The objective lens 3 in the camera 1 is a known type of zoom lens, that is, a lens of variable focal length which can be adjusted continuously by movement of separate groups of elements in the lens to change the focal length of the lens. That is done in order to vary the angular field of view (coverage) of the objective lens 3 between a wide-angle limit and a telephoto limit. Alternatively, a lens assembly may be provided having a plurality of interchangeable elements for changing the focal length or angular field of view. The objective lens 3 includes a front four-element section 17 which moves in a double action path along the optical axis O, first back (rearward) and then forward as the focal length of the lens is changed from a wide angle limit of, for example, 35 mm. to a telephoto limit of, for example, 80 mm. Conversely, a rear six-element section 19 of the objective lens 3 moves forward along the optical axis O in an almost smooth, linear path as the focal length of the lens is adjusted from about 35 mm. to about 80 mm. At the shortest focal length of the objective lens 3, i.e., the wide-angle limit 35 mm., the front and rear sections 17 and 19 of the lens are farthest apart and the angular field of view is approximately 63°. At the longest focal length of the objective lens 3, i.e. the telephoto limit 80 mm, the angular field of view is approximately 280°. Thus, the field range of the objective lens 3 is about 63° to 280°.

The cassette of this invention can be encoded for selected formats, i.e. cassette encoded format information (CEFI), for use with compatible cameras which provide normal size, pseudo telephoto or pseudo panoramic prints. In a preferred embodiment, the cassettes are used with cameras with an adjustable feature which provides pseudo panoramic prints with an aspect ratio that can be varied to create any format from the standard format for 35 mm film with an aspect ratio of 1.5 to the popular pseudo panoramic format with an aspect ratio of 2.75. Other formats, for example High Density Television (HDTV) displays with an aspect ratio of 1.75, or formats with aspect ratios less than 1.5 or greater than 2.75 can be encoded as the customer demands. Compatible cameras have built in sensor panels (not shown) to decode the CEFI and automatically set the format. As well as being linked to format panels, a suitably encoded CEFI cassette can also be linked to the viewing aperture and other information panels on the camera.

Figure 2:
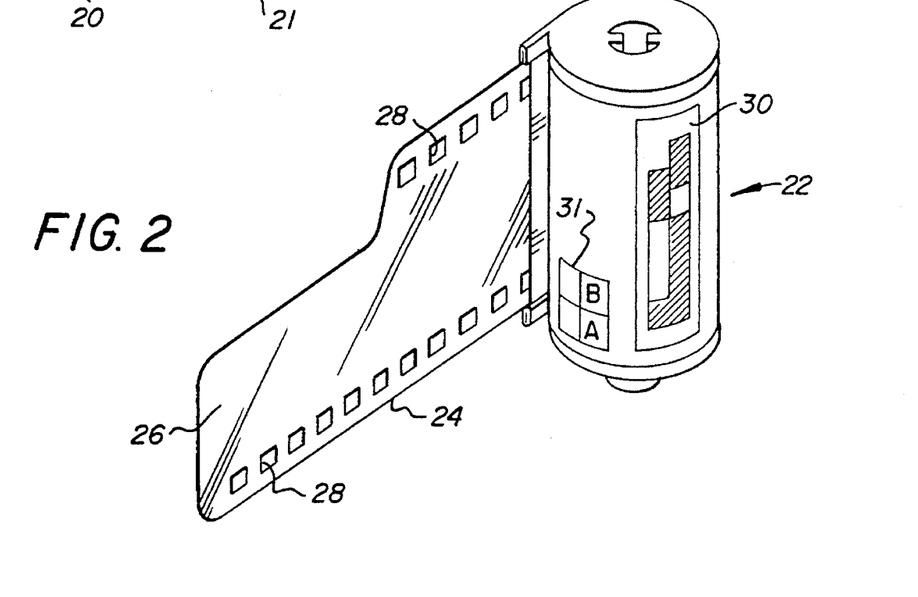
FIG. 2 is a perspective view of a CEFI cassette with electronic encoding patches.

The photographic element cassette in accordance with a preferred embodiment of the invention is shown in the perspective drawing, FIG. 2. In FIG. 2 there is shown a CEFI film cassette 22 for a 35 mm camera which is loaded with a 35 mm photographic element 24 having a leader portion 26 with sprocket holes 28 for engaging a take-up spool (not shown) in the camera.

Figure 3:
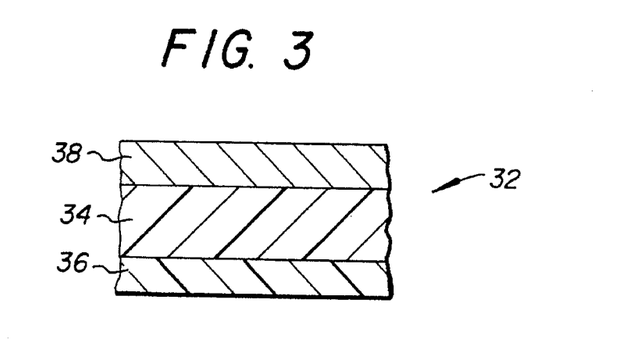
FIG. 3 is a schematic cross sectional side view of a film having a magnetic recording layer.

Preferably, the cassette 22 is used with a camera adapted to receive and utilize a photographic element, for example, a photographic film of the type schematically illustrated in FIG. 3 where there is shown a cross section of film 32 having a base layer 34 with a photographic emulsion layer 36 on one side and a layer of magnetic recording material 38 on the other side. The magnetic recording layer 38 can be used to record information to permit mid roll interruption which is described in greater detail below. In one aspect of the invention whereby the film is completely exposed in the selected format before rewinding, the magnetic recording layer 38 need not be activated, or a film without the magnetic recording layer can be used.

Referring again to FIG. 2, a conventional 35 mm cassette is usually provided with a conductive patch area 30 on the surface which is encoded with information related to, for example, film speed and size. Electrical contacts in the film cassette cavity of the camera read the code and automatically set the parameters, such as film speed, and thus control the exposure settings of a compatible automatic exposure camera. This is exemplified in the photographic industry by the DX-coding system. In a preferred embodiment of this invention for a CEFI cassette another conductive patch area 31 on the surface of the cassette is reserved for encoding format information. The area can contain a plurality of small rectangular patches, for example two to four patches. In one embodiment of the invention the encoded patches are either conductive or non-conductive. The pattern of conductive and non-conductive patches is predetermined (by convention) for each of a series of aspect ratios desired by the industry. In an exemplary coding arrangement area 31 is allotted only two patches for CEFI encoding, A and B. If conductivity of the patch is indicated by a "+" and non-conductivity by a "−" then Chart 1 illustrates how the two patch system can encode four different patterns which correspond to four selected aspect ratios.

| | | CHART 1 | |
|---|---|---|---|
| A | B | Aspect Ratio | Format |
| − | − | 1.5 | Standard 35 mm |
| + | − | 1.75 | HDTV |
| − | + | — | Reserved |
| + | + | 2.75 | Pseudo Panoramic |

A compatible camera is equipped with sensors (not shown) to detect the pattern and a means for controlling the format set up in the camera to give the desired aspect ratio. It is apparent that by utilizing more than two patches additional aspect ratios could be encoded and set.

A cassette can be encoded for normal, pseudo telephoto and pseudo panoramic formats. It can also be encoded so that if it is used with an incompatible camera, a signal is given to indicate that the cassette cannot be used with the camera. For example, a cassette encoded for a pseudo telephoto format cannot be used with a camera designed to take normal and/or pseudo panoramic formats only.

It is apparent that, for example, a metal cassette with conductive and non-conductive patches thereon or a plastic cassette with conductive and non-conductive patches on an applied label may be used to encode the CEFI. The location of the encoding features is not limited to the location shown in FIG. 2.

Figure 14A:
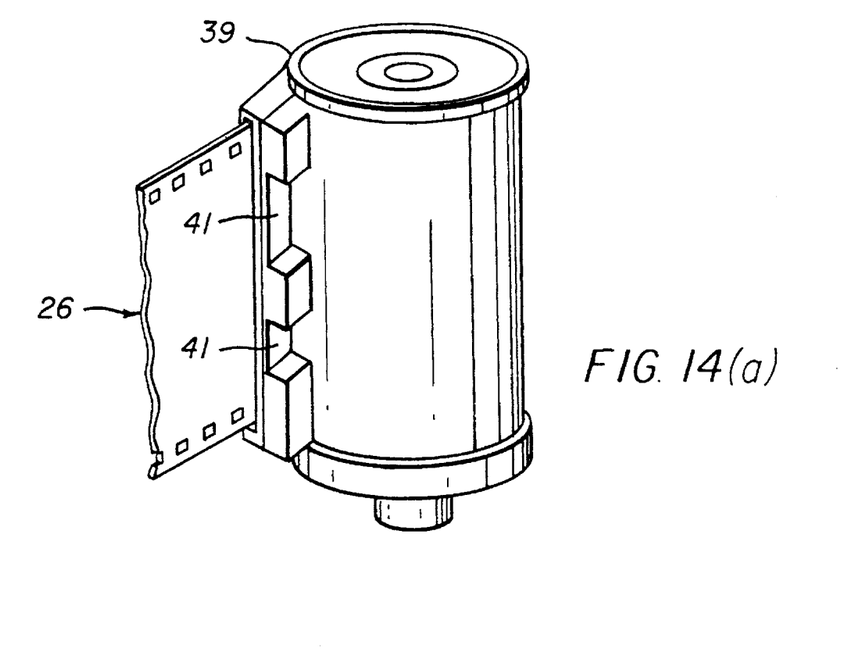
Figure 14B:
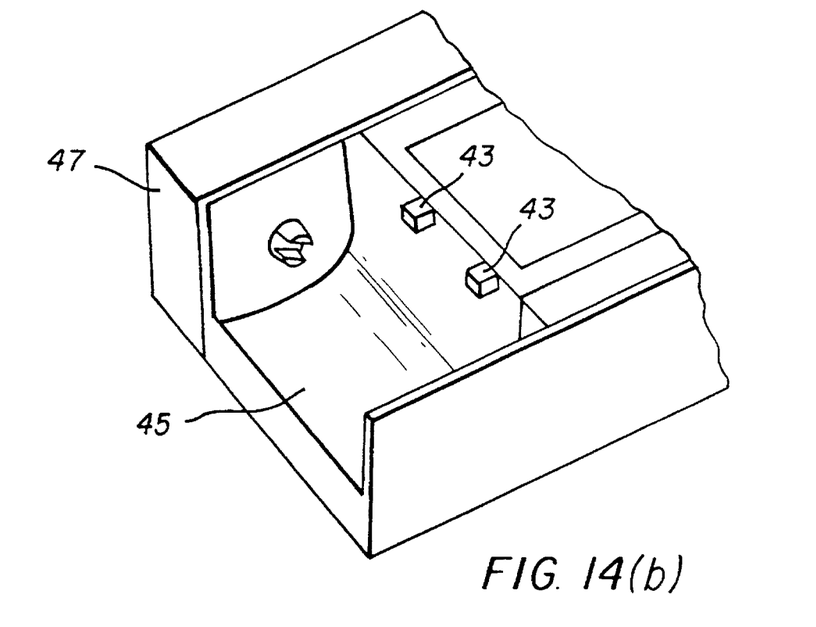

Alternately, as shown in FIGS. 14(a) and 14(b), mechanical means such as a pattern of notches 41 at reserved encoding locations on a cassette 39 can be used to cooperate with corresponding projections 43 in the cassette cavity 45 of a camera 47 to control the format set up of the camera.

Such a CEFI cassette containing, for example, a standard 35 mm film can be used to set a selected format in a camera for exposing the entire roll of film at that format before removal of the cassette. For such use there is no need to record film utilization, and the magnetic recording layer of the film is not necessary.

The described cassette is preferably encoded with both format and DX-coded information. However, a cassette without the DX-coded information can also be used with cameras wherein such parameters are set manually. In addition to the CEFI code, the cassette 22 can have machine readable bar codes and/or eye readable label information on the cassette to alert the photo finisher to the format change.

Figure 4:
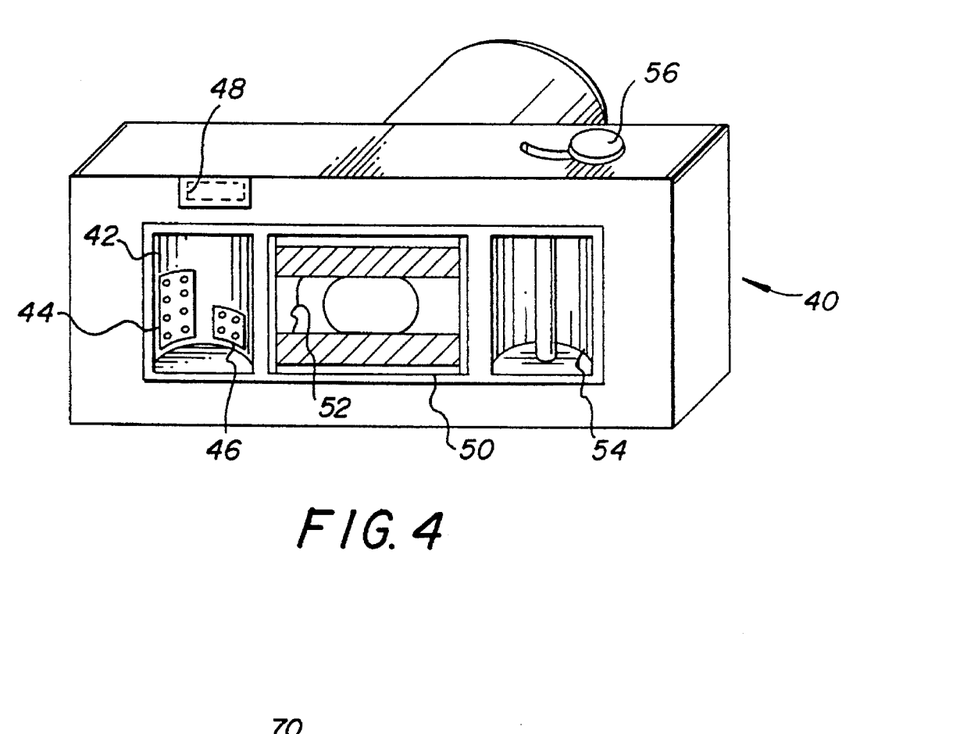
FIG. 4 is a rear perspective view of a camera depicting the electronic sensors in the cavity for receiving the cassette and a mask in the exposure plane.

Referring now to FIG. 4, the rear view of a CEFI compatible 35 mm camera 40 is shown. The cavity 42 of the camera receives the CEFI cassette. The sensing features 44 and 46 within the cavity 42 become coincident with the coding features on the cassette and read, for example, the DX-codes 30 and the format codes 31 of the cassette previously shown in FIG. 2. The CEFI sensing feature 46 in the camera can be mechanical or electronic, depending on the method which is used to encode the corresponding cassette. The sensing features can be conviently and alternatively located; for example, positioned on the camera back. Regardless of the method used, however, the sensors 44, 46 cooperate with a control means (not shown) in the camera to set the format of the camera. The format control means are linked to a masking unit located, for example, in the viewfinder 48 or the film exposure plane 50 of the camera, or both. For example, an opaque shield 52 in the exposure plane of the camera is shown. The film is wound forward onto the take-up spool 54 by means of a winder 56. The winder can be manual or motor driven.

A preferred embodiment of the invention provides a means for mid-roll interruption of the exposures. This feature permits rewinding of a partially exposed film into the cassette, removal of the cassette, reinsertion of the cassette at a later time and winding forward of the film to the point of interruption. It is necessary, however, to ensure that the film leader is not completely retracted into the cassette on rewinding the film so that the film becomes available for reloading. This can be readily achieved in cameras having manual rewind whereby the user can sense the leader release from the take-up spool and stop rewinding at that point. Alternately in automatic rewind cameras, it is known that provisions can be made for shutting off the rewind motor when the film has been rewound so that the leader is still extended, for example, by linking the motor to the exposure counter or by permitting an electrical contact to be made to stop the motor when the film releases from the take-up spool.

The mid roll interrupt feature requires a photographic element provided with a means thereon for recording the extent of element utilization. This recording feature allows for interruption of the use of the element prior to full utilization of the customer unit. The photographic element can be, for example, a film with a magnetic recording layer thereon, such as previously shown in FIG. 3. Also required is a corresponding device in the camera; for example a magnetic device, which encodes the film as the frames are exposed. The magnetic recording layer 38 on the film records the extent of utilization of the film so that if the cassette in the camera is rewound, removed, then reloaded, the film can be wound forward to the next unexposed frame and double exposures are avoided.

U.S. Pat. No. 5,132,715 describes a magnetic erasing system which can be used to determine the extent of film utilization in the camera. Such a method can be used with the camera of this invention.

Figure 5:
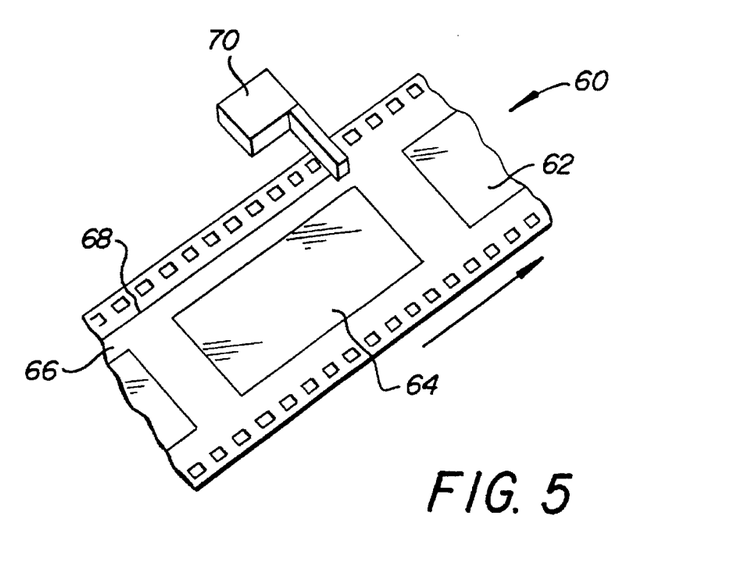
FIG. 5 is a plan view of a film strip with a magnetic data track.

Referring to FIG. 5, a plan view of a filmstrip 60, for example, a 35 mm filmstrip, suitable for use with the CEFI cassette of the invention is shown with an exposed image frame 62 and an unexposed image frame 64. Both image frames are to be exposed in the selected format for the CEFI cassette in use. Recorded in the magnetic layer 66 of the film is a magnetic data track 68. A compatible camera includes a magnetic erasing head 70 comprising a pair of oppositely poled magnets aligned with the track 68. As the filmstrip is automatically advanced through the film gate following each exposure, track 68 is erased by the external magnetic field underneath the junction between the pair of magnets. In this way the erasure of the track adjacent each exposed frame may be used to indicate the extent of usage of the film. Provision is made in the camera for magnetic read heads to normally read the data track 68 when a partially exposed film is reloaded in the camera, and the film is advanced to the point of interruption as indicated by track 68. The read head responds to the absence of any data in the segment of track when the film is advanced.

In another embodiment where the camera requires manual advance of the film, an electrical impulse would be needed to activate the magnetic head and cause erasure of the track as the film advances.

Other means for recording and reading film utilization are known to those of skill in the art. For example, information indicating the extent of film utilization could be recorded as discrete, encoded data-bits on one or more parallel data-tracks. A camera could be provided with a magnetic write head to write encoded data bits on the film and a magnetic read head to record the extent of film utilization when the film is reloaded.

With such a mid roll interrupt feature, the photographer can rewind and remove a partially exposed first cassette encoded with one format, load the camera with a second cassette encoded and dedicated to a different format depending on the format needed for the photographic opportunity. The camera is then automatically set to the new format. On removal of the second cassette, the first cassette can be reloaded and additional frames can be exposed corresponding to the original format of that cassette. Each cassette is used for a single selected format, thus permitting the photofinisher to set a printer for the entire roll.

In most cameras, the film is wound out of the cassette as the film is exposed. However, some cameras prewind the film from the cassette prior to exposure and rewind upon exposure. In either type of camera, the mid roll interrupt feature can function if, for example, the power supply to the magnetic erasure is not activated during the camera load phase, but is activated only during the frame advance mode following an exposure. While it is possible to locate the magnetic head such that film passes the head prior to or subsequent to exposure, in order to allow use of the partially exposed film in different cameras the position of the magnetic erasure head should be standardized.

In addition, the CEFI area on the cassette can also interface with any compatible photographic processing equipment that uses the cassette in the feed station. Such equipment can read record the format; for example; on the magnetic media track reserved for photofinisher use so that subsequently a printer photofinishing can be automatically set up for the indicated format. Having the entire photographic element unit exposed with a consistent format minimizes the number of changes and interruptions for a photofinisher and thereby increases productivity over current frame by frame changes of printer set up.

Figure 6:
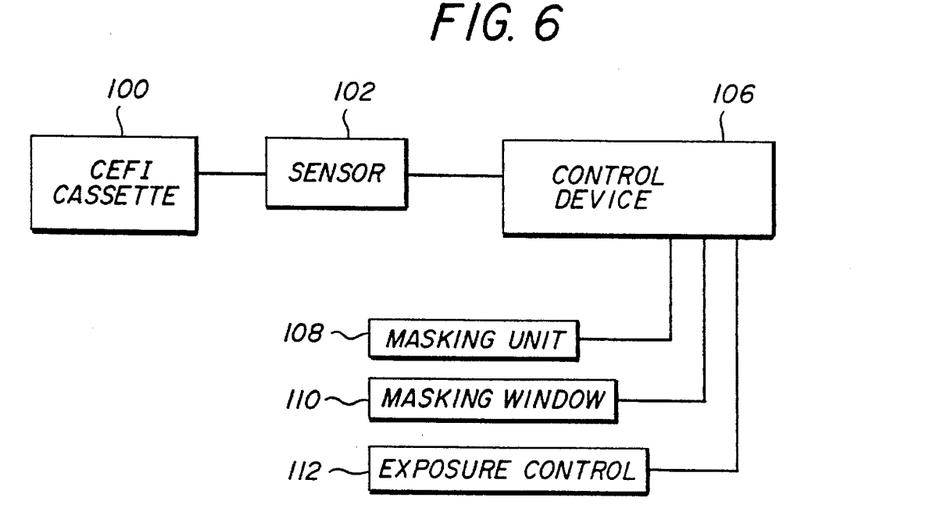
FIG. 6 is a schematic diagram of control circuitry in the camera.

According to FIG. 6, the CEFI cassette 100 engages a sensor device 102 which is linked to a control device 106. The control device 106 is a known logic circuit which decodes the binary signal from the sensor 102, operatively couples to a masking unit 108 of the camera, and automatically adjusts and sets the selected format in response to the decoded signal.

The camera utilizes as sensors, for example, a set of electrical probes (not shown) which contact the conducting or insulating areas on the film cassette. The arrangement of these areas provides an electrically readable binary encodement which is subsequently decoded by the logic circuit 106 to set the camera format. In the mechanical embodiment of the masking unit described for FIGS. 7–10 below, the electrical impulse can be sent to the logic circuit during the automatic pre-load phase.

In another embodiment of the invention the camera includes a masking window 110 for viewing the subject in the selected format before exposing the film. The masking window 110 is also automatically adjusted and set by the logic circuit 106. The masking window 110 can be used instead of a masking unit 108, or in conjunction with a masking unit to obtain pseudo format exposures. In yet another embodiment of the invention the logic device 106 is linked to an exposure control unit 112 for controlling the exposure to the photographic element in accordance with the amount of light reaching the unmasked portion of the photographic element so that the portion of the film frame used to produce the pseudo print can be more accurately exposed.

The format set up in a camera can be adjusted in a number of ways known to the art. For example, U.S. Pat. No. 4,678,299 describes a camera in which a masking unit in the view finder field is electronically activated in response to a manually adjusted format setting of the zoom lens to frame a selected portion of a subject to be photographed. According to the format setting a liquid crystal display (LCD) is automatically activated to form an opaque mask so that the operator's view of the subject has an aspect ratio corresponding to the selected format. RE 32,797 discloses in place of the LCD masking unit, a finder lens in the viewfinder which is automatically adjusted to change its angular field of view to a different format in response to a manual setting of the zoom lens. According to one aspect of this invention depicted in FIG. 6 the control device 106 is linked to a masking window 110. The masking window can be in the form of the known LCD masking unit or finder lens in the viewfinder described above. The control device 106 automatically adjusts and sets the LCD mask or the angular field of view in the viewfinder field in response to the selected format of the CEFI cassette.

Referring to FIG. 1, in SLR cameras, the viewing is through the same lens which is used to expose the film. However, during the viewing of the scene, a mirror intercepts the image and diverts it through a viewfinder. It is possible in this camera to locate the LCD viewfinder masking unit on the mirror 5 or, more preferably on the prism 13.

Preferably, the format in a camera can be set by a means for adjusting a framing mask at the exposure plane of the camera. This is particularly useful for varying the image area between a standard format and a panoramic format by providing a method for partly covering the rectangular aperture frame with a masking material along the longitudinal sides of the aperture frame. More preferably, an adjustable feature is included in the camera that can create any exposure aspect ratio from 1.5 to 2.75 as desired and encoded by the CEFI cassette. The adjustable feature preferably adjusts the aperture of the framing mask at the exposure plane by means of a masking material, such as, for example a shutter cloth or an opaque blade or shield, that can be closed over a portion of the exposure plane. Referring again to FIG. 4 there is shown a masking unit 52 in the exposure plane 50 of the photographic element for providing a panoramic format.

FIGS. 7–10 depict a preferred embodiment of the invention in which the camera is provided with a masking unit having a moveable opaque screen located in front of the exposure plane of the camera for setting the selected format. The screen is responsive to a binary signal from the CEFI cassette transmitted by the sensors and decoded by the control device. During loading and initial advancement of the film the CEFI cassette simultaneously completes the circuit and the screen is advanced by a detent controlled mechanism to form the mask corresponding to the CEFI selected aspect ratio.

Figure 7:
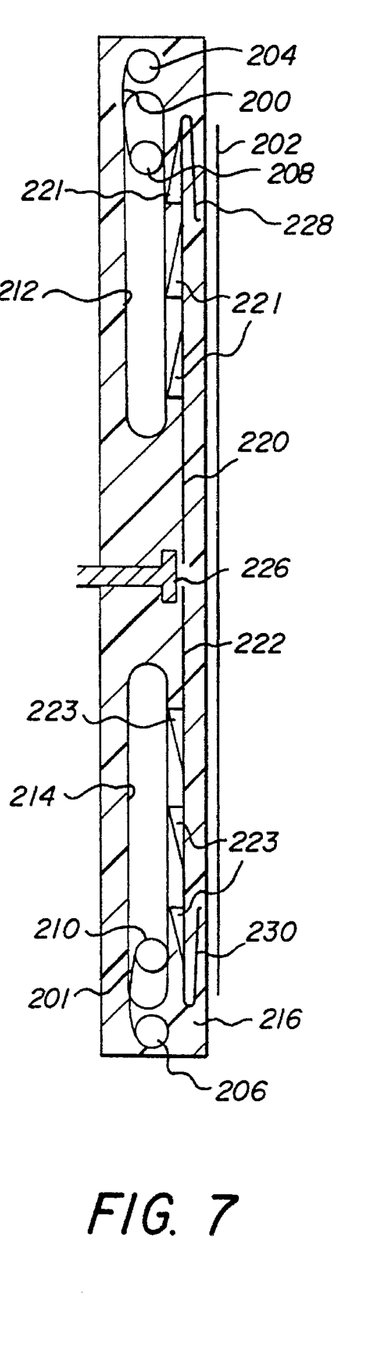
FIG. 7 is a schematic side view of the detent mechanism in the camera.

In FIG. 7, there is depicted opaque screens 200, 201 which are located in the camera aperture in front of the exposure plane 202 of the camera. The mechanism for setting the screens 200, 201 to form masks corresponding to the CEFI desired aspect ratios is replicated both on both sides of the aperture. The screens are positioned and adjusted to provide discrete aspect ratios by a detent mechanism described hereafter.

The opaque screens in the form of, for example, first and second rolls of shutter cloth 200, 201 are wound around and carried by first and second top bars 204, 206 located above and below and along the longitudinal sides of the film plane. The rolls of cloth are attached to first and second pull bars 208, 210 which are aligned parallel to the top bars. The ends of the pull bars 208, 210 slide in corresponding guide slots 212, 214 which are cut into a camera frame member 216 along each of the latitudinal sides of the film plane. The top bars 204, 206 are connected to a rewinder; for example they are clock spring wound to provide tension on the screens. The guide slots 212, 214 are adjacent to detent slots, shown in FIG. 9, cut into the camera frame member 216, for receiving corresponding upper and lower detent arms 220, 222 respectively. The detent arms 220, 222 bear a plurality of notches 221, 223 located at discrete distances along the length of each detent arm for engaging and capturing the ends of the pull bars. The detent arms 220, 222 each have spring formed ends 228, 230 which forceably hold the detent arms in the detent slots so that the detent notches protrude into the guide slots.

Figure 8:
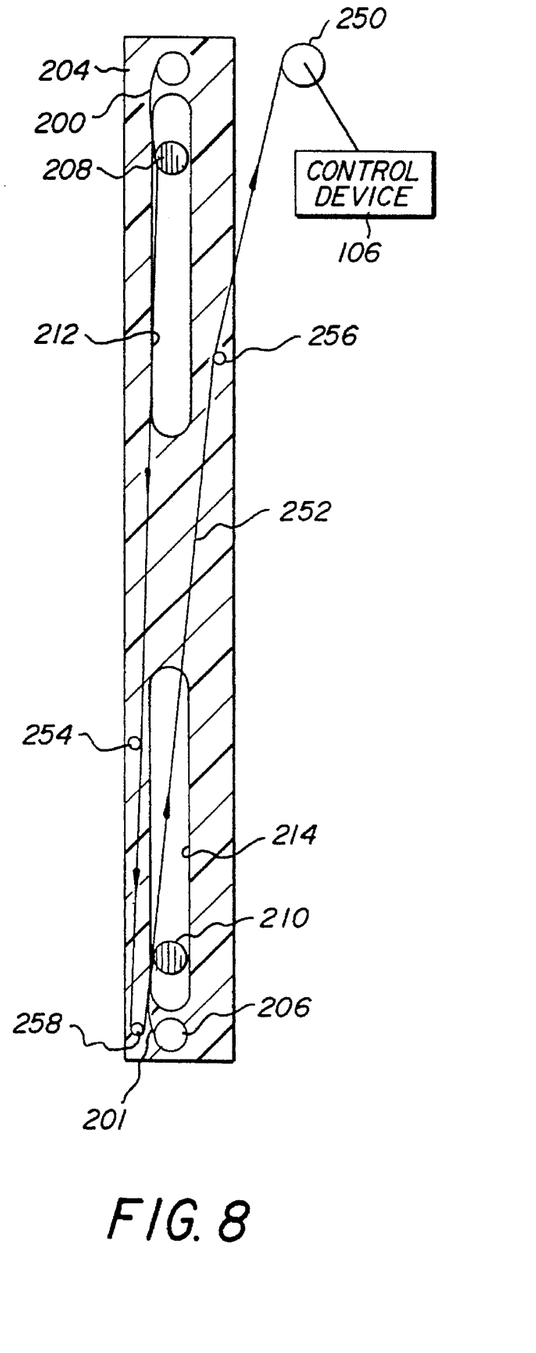
FIG. 8 is a schematic side view of the advancing wire mechanism in the camera.

In FIG. 8, there is depicted another side view of the mechanism for setting the format, in which the detent mechanism is omitted for clarity. A wire take-up core 250 is shown which winds up an advancing wire 252. The advancing wire 252 is attached to the first and second pull bars 208, 210 via guide pulleys 254, 256 and a return pulley 258. The take-up core 250 is driven by the power source used to advance the film in the camera during the film loading stage. When the CEFI cassette completes the circuit to the control device 106 (FIG. 6) the binary input from the CEFI is decoded and the amount of circumferential travel of the take-up core 250 is controlled to give the selected format. The rotation of the take-up core 250 pulls the advancing wire 252, which in turn moves the pull bars 208, 210 in the guide slots 212, 214 a discrete distance towards the center of the film aperture opening. The pull bars 208, 210 advance the shutter cloths 200, 201 to form a mask corresponding to the CEFI selected aspect ratio. As the pull bars 208, 210 advance toward the center, they pass over the detent arm notches 221, 223 (FIG. 7) which protrude into the guide slots 212, 214 and prevent the pull bars from retracting. The advance of the pull bars 208, 210 stops when the pull bars engage and are captured by the notches 221, 223 located at a distance corresponding to the distance required to give the CEFI selected format.

Figure 9:
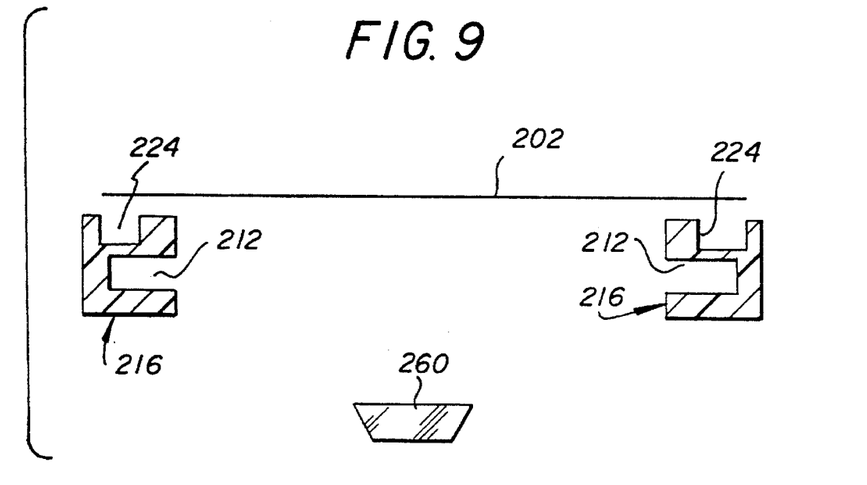
FIG. 9 is a schematic top view of the detent mechanism in the camera.

FIG. 9 is a top view of the camera showing the portion of the camera frame 216 located between the film plane 202 and the lens 260. The frame member 216 has the guide slots 212 and the adjacent detent slots 224 cut out. The detent slots 224 receive the detent arms 220, 222. Referring again to FIG. 7, a release plunger 226 is located in the camera frame 216 in front of the detent arms 220, 222 for slidably pushing against the arms. The detent arms 220, 222 enter the detent slots whenever the plunger 226 is not activated. During the loading and initial advance of the film the release plunger 226 is not activated, allowing detent arms 220, 222 to enter the detent slots 224 (FIG. 9) cut into frame members 216. Activation of the plunger 226 can occur, for example, by the same mechanism (not shown) which trips the anti-backup clutch incorporated in current cameras. When the film is to be rewound, the release plunger 226 is activated to push the detent arms 220, 222 forward and release the pull bars 208, 210. As the clock spring wound top bars 204, 206 are under tension they recoil, winding the shutter cloths 200, 201 around the top bars while simultaneously retracting the pull bars to the default (fully open) position. Loading a different CEFI cassette or reloading the same CEFI cassette automatically resets the shutter cloths 200, 201 for the selected format for each CEFI cassette.

Figure 10:
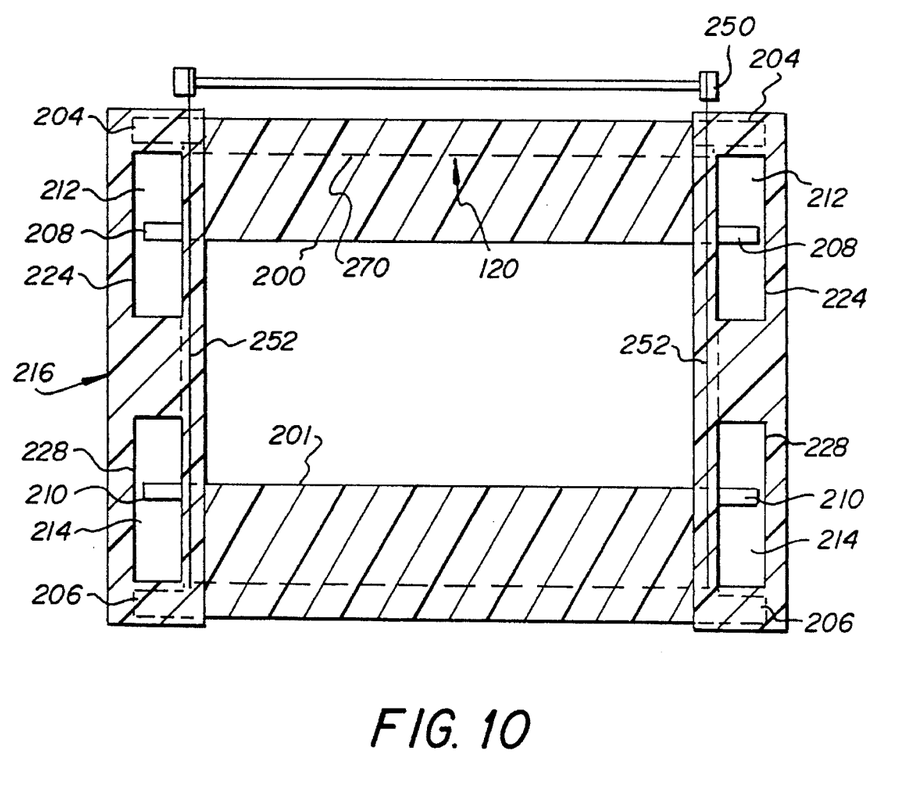
FIG. 10 is a schematic front view of the detent mechanism in the camera.

FIG. 10 is a sectional view of the film aperture and the masking mechanism showing both sides of the aperture as viewed from the lens side of the camera. The film aperture 120 is depicted by the rectangle formed by the hatch lines 270. The film aperture is partially masked by the first and second rolls of shutter cloth 200, 201 which have been pulled from the first and second top bars 204, 206 respectively by the advancing first and second pull bars 208, 210. The pull bars 208, 210 are advanced along the guide slots 212, 214 by the advancing wire 252 as it is taken up by the rotating take-up core 250. The shutter cloth 200, 201 is held in the CEFI selected format position by the notches 221, 223 on the detent bars (FIG. 7), which engage and capture the pull bars in the guide slots. The detent arms 220, 222 are carried in the detent slots 224, 228 located adjacent to and behind the guide slots 212, 214 so that the notches protrude into the guide slots. The portion of the film not masked by the shutter cloths 200, 201 has the aspect ratio of the selected format so that when the camera shutter is opened the image of the subject is recorded in the unmasked area of the frame. The developed frame will thus be in the selected format.

Referring again to the SLR camera of FIG. 1, an aperture mask 21, such as the mechanical detent mask described in FIGS. 7–10, could be located between the objective lens 3 and the mirror 5. In this location, the mechanical mask provides control of the film are exposed, exposure control and viewing screen control.

Figure 11:
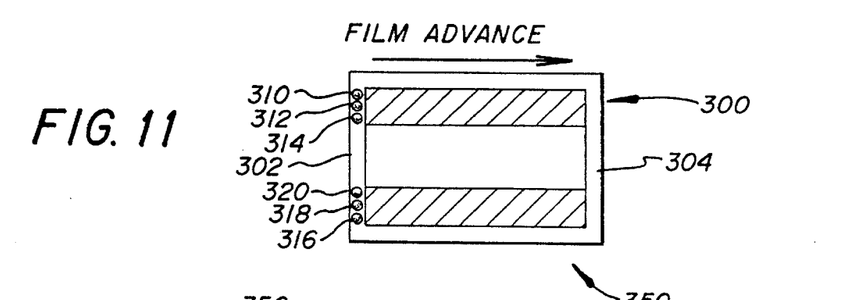
FIGS. 11 to 13 are schematic illustrations of the LED masking mechanism in the exposure plane of the camera.
Figures 12, 13:
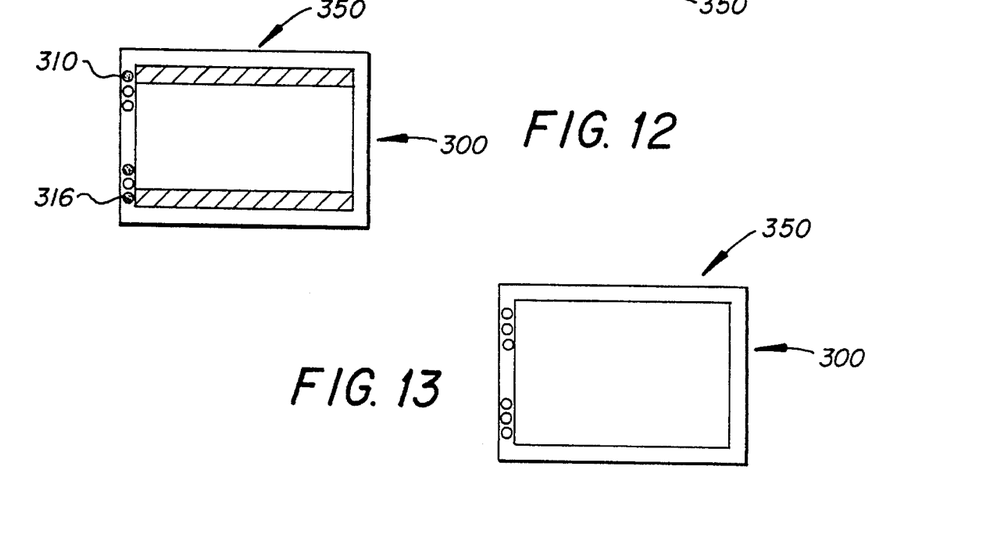

FIGS. 11 to 13 depict another embodiment of the invention in which a masking unit 350 is located in the exposure plane 300 of the camera between the film and the aperture of the camera. Referring to FIG. 11, the masking unit 350 is located along the leading latitudinal edge 302 of the frame member 304 surrounding the aperture over which the advancing film passes as it is wound forward frame-by-frame. The masking unit 350 includes two sets of light emitting diodes (LED's) positioned at upper and lower regions of the leading edge 302, each set being equidistant from the mid-point of the exposure plane. Each set of LED's contains a plurality of LED's, the number of which can vary depending on their finite range of influence and the length of the region to be influenced and the number of format options to be accommodated. For exemplary purposes, FIG. 11 shows an upper set of three LED's 310, 312, 314 and a lower set of three LED's 316, 318, 320 along the latitudinal side 302 of the aperture frame 304. As the film is advanced over the LED's, the selected format code on the CEFI cassette causes the control device 106 (FIG. 6) to energize corresponding sets or sub-sets of the LED's which expose and fog rows of film within a finite range of influence of each energized diode. The diodes are spaced so that the exposed rows will form a continuous opaque mask corresponding to the selected format on development of the film. The portion of the film not influenced (exposed) by the LED's and lying in the exposure plane of the camera has the aspect ratio of the selected format so that when the camera shutter is opened the image of the subject is recorded in the unmasked area of the frame. The developed frame will thus be in the selected format.

Chart 2 illustrates how the CEFI cassette encoded for a binary code (as described for Chart 1) signals energization of 0, 2 or 6 LED's so that the desired aspect ratios are formatted. FIGS. 11, 12 and 13 illustrate the masking units formed when 6, 2 and 0 diodes are energized respectively.

CHART 2

| A | B | Binary Code | LED's ON | Aspect Ratio | FIG. No. |
|---|---|---|---|---|---|
| – | – | 00 | None | 1.5 | 13 |
| + | – | 10 | 310,316 | 1.75 | 12 |
| + | + | 11 | 310,312,314 316,318,320 | 2.75 | 11 |

A camera equipped with the masking units just described in FIGS. 7–10 or 11–13 preferably is also equipped with a corresponding means for allowing the customer to view the subject to be photographed in the same format as selected by the CEFI cassette in use. Such viewing means are well known. For example, the camera of the invention is readily adapted by persons skilled in the art to accommodate the view finder masking means such as described in U.S. Pat. No. 4,678,299.

Combinations of masking units for reducing horizontal or vertical dimensions could be incorporated in the camera of the invention to allow pseudo panoramic and/or pseudo telephoto exposure formats to be taken.

In yet another embodiment of the invention, the CEFI cassette is used with a camera provided with a means for controlling the light exposure to the photographic element in accordance with the amount of light reaching the unmasked portion of the photographic element. Thus, the portion of the film frame used to produce the pseudo print can be more accurately exposed. Such exposure control means are well known. For example, a camera of the invention is readily adapted by persons skilled in the art to accommodate the exposure control system incorporating a photocell, described in RE 32,797, in which the amount of light reaching the photocell is controlled in accordance with the selected format. Thus, the portion of the film frame covered by the selected pseudo field of view will be exposed in proportion to the amount of light available to the area with the selected aspect ratio.

This invention provides an advantageous method for a photographer to control the exposure format of a film, to expose film in a variety of formats with a single camera, and to permit the film to be processed in batches, at high speeds, and therefore at low cost. By providing a cassette encoded with camera readable format information and a compatible camera which is responsive to the CEFI cassette so that the selected format is automatically set for as long as the cassette is in the camera, the photographer can expose the entire roll of film in a single format. With the mid-roll interrupt feature, the photographer can readily change to a different format by exchanging cassettes encoded with different formats. Since the entire roll of film in a cassette is exposed in a single format, there is no need to adjust photofinishing equipment on a frame by frame basis to product the desired format.

While the invention has been described in connection with a presently preferred embodiment thereof, those skilled in the art will recognize that many modifications and changes may be made therein without departing from the true spirit and scope of the invention, which accordingly is intended to be defined solely by the appended claims.

What is claimed is:

1. A photographic element cassette encoded with format information (CEFI) for automatically configuring a compatible variable format camera in a selected format, comprising:

a film cassette body; and a photographic element with at least one light sensitive layer thereon contained in the cassette body for exposure in a single format throughout the entire element; is characterized by:

a camera readable feature on the cassette encoded with a selected exposure format which feature is positioned on the exterior of said cassette body to engage a sensor in the camera in a manner that automatically sets and maintains the camera for the selected exposure format as long as the cassette is in the camera, wherein said camera readable feature is a pattern of notches for mechanically engaging the sensor, said sensor including a mechanical interface for engaging said pattern of notches.

2. The cassette of claim 1 including interface means by which the camera readable feature can also interface with photofinishing equipment for allowing automatic set up of said photo finishing equipment for printing the processed photographic element in the selected format.

3. The cassette of claim 1, in which the photographic element comprises a filmstrip wound within the cassette.

4. The cassette of claim 3, in which the filmstrip further includes a magnetic recording layer.

5. The cassette of claim 4, in which the filmstrip further includes a prerecorded magnetic track within the magnetic recording layer for recording the extent of film utilization so that exposure of the filmstrip can be interrupted prior to full utilization of the film (mid-roll interrupt), the filmstrip rewound into the cassette and the cassette removed from the camera for later use.

6. The cassette of claim 1, in which the CEFI selects an exposure format having an aspect ratio of from about 1.5 to 2.75.

7. A variable format camera for use with a compatible CEFI encoded cassette containing a photographic element comprising:

sensing means for sensing the CEFI codes on the cassette while the cassette is in the camera;

means connected to said sensing means for controlling the exposure format set up of the camera responsive to the CEFI code on the cassette so that the encoded format is automatically set; and means connected to said controlling means for setting and maintaining the exposure format setup of the camera for the selected exposure format as long as the cassette is in the camera, said format setting means including a plurality of LEDs located along a leading longitudinal edge of a camera frame member and surrounding an exposing aperture of the camera over which the advancing film passes, whereby in response to the CEFI encoded cassette sets of the LEDs are energized, said energized sets of LEDs expose and four rows of film within a finite range of influence of the set so that the unexposed area of the film has the selected format.

8. The camera of claim 7, further including means for controlling the light exposure to an unmasked area of the selected exposure format.

9. The camera of claim 8, in which the exposure controlling means comprises a photocell whereby the amount of light reaching the photocell is proportional to the area of the selected exposure format.

10. The camera of claim 7, further including means for recording the extent of utilization of the photographic element on the element.

11. The camera of claim 10, in which said recording means includes a magnetic head for generating an external magnetic field whereby as the photographic element having a prerecorded magnetic track is advanced after each exposure the track is selectively erased by the magnetic field.

12. The camera of claim 10, further including means for reading the extent of utilization of the photographic element in a cassette subjected to mid-roll interruption so that the photographic element can be wound forward to the point of interruption and further utilized without double exposure of any frames.

13. The camera of claim 7, wherein the sensing means comprises electronic sensing means.

14. The camera of claim 7, wherein the sensing means comprises mechanical sensing means.

15. The camera of claim 7, in which the format setting means includes an LCD mask in the view finder field of the camera.

16. The camera of claim 7, in which the format setting means includes a finder lens in the viewfinder field of the camera wherein the angular field of view of the finder lens is adjustable for the selected format.

17. A camera according to claim 14, wherein said cassette includes a pattern of notches for encoding the format information, said camera including a cassette cavity for retaining said cassette, said cavity including a series of projections for engaging said pattern of notches to control the format setup of the camera.

18. A variable format camera for use with a compatible CEFI encoded cassette containing a photographic element comprising:

sensing means for sensing the CEFI codes on the cassette while the cassette is in the camera;

means connected to said sensing means for controlling the exposure format set up of the camera responsive to the CEFI code on the cassette so that the encoded format is automatically set; and means connected to said controlling means for setting and maintaining the exposure format set up of the camera for the selected exposure format as long as the cassette is in the camera, whereby the format setting means comprises a masking unit located in front of the exposure plane of the camera, in which said masking unit comprises one or more moveable opaque screens for masking the film wherein said screens are located in the camera aperture in front of the exposure plane of the camera, and in which said masking unit comprises:

first and second rolls of shutter cloth;

first and second top bars located above and below and along the longitudinal sides of the film plane for carrying the first and second rolls of shutter cloth;

first and second pull bars attached to the first and second rolls of cloth and aligned substantially parallel to the top bars;

an advancing wire attached to the first and second pull bars;

a wire take-up core connected to the advancing wire for winding up the advancing wire;

guide slots cut into the camera frame along each of the latitudinal sides of the film plane for receiving and guiding the ends of the pull bars, whereby on advancing the photographic element during the element loading stage the pull bars are simultaneously advanced by the advancing wire along the guide slots;

a plurality of detent arms located adjacent the guide slots, each arm having a plurality of notches located at discrete distances along the length of the detent arm and protruding into the guide slots for engaging and capturing the pull bars;

a plurality of detent slots cut into the camera frame adjacent the guide slots for receiving the detent arms, and spring formed ends on the detent arms for forceably holding the detent arms in the detent slots so that the detent notches protrude into the guide slots, whereby as the pull bars advance the CEFI selected distance they are captured by the detent arm notches and the shutter cloths are thus set in a position corresponding to the selected format.

19. The camera of claim 18, in which the masking unit further includes a rewinder connected to the first and second top bars for rewinding the shutter cloths and retracting the pull bars to the fully open position.

20. The camera of claim 19, in which the rewinder is a clock spring.

21. The camera of claim 18, in which the masking unit further includes a release plunger located in the camera frame in front of the detent arms for slidably pushing against the arms to release the pull bars.

22. A method for controlling the exposure of an entire roll of a photographic element with a consistent format in a variable format camera, comprising the steps of:

encoding a film cassette, containing a photographic element with at least one light sensitive layer thereon, with a camera readable feature for setting a selected exposure format wherein said camera readable feature is a pattern of notches;

loading the the cassette into the camera, said camera having a mechanical interface responsive to the cassette encoded format information (CEFI) on the pattern of notches so that the camera is automatically set and maintained for the selected format while the cassette is in the camera;

exposing each frame of said photographic element to light from a subject to obtain a latent image having the selected format; and advancing said photographic element frame-by-frame with the format setting unchanged.

23. A method according to claim 22, in which the photographic element includes a magnetic recording layer with a pre-recorded magnetic track thereon for recording the extent of element utilization and the camera includes a means for recording and reading the extent of element utilization further comprising:

recording on the photographic element the extent of element utilization as it is advanced frame-by-frame;

interrupting exposure of the photographic element by rewinding the partially exposed photographic element into the CEFI cassette so that the film leader is not retracted into the CEFI cassette;

removing the CEFI cassette from the camera;

reloading the CEFI cassette into the camera; and advancing the photographic element to the point of interruption so that further frames can be exposed with the same selected format.

24. A method according to claim 22, further including the step of:

printing the photographic element by using photographic printing equipment which interfaces with the CEFI cassette and thus the printing equipment is automatically set up for the selected format.

* * * * *

UNITED STATES PATENT AND TRADEMARK OFFICE
CERTIFICATE OF CORRECTION

PATENT NO. : 5,561,484
DATED : October 1, 1996
INVENTOR(S) : Alfred B. Fant, et al It is certified that error appears in the above-identified patent and that said Letters Patent is hereby corrected as shown below:

On the title page, item [56],

--     FOREIGN PATENT DOCUMENTS

3445722   07/1985    Germany      --

Signed and Sealed this

Ninth Day of December, 1997

Attest:

BRUCE LEHMAN

Attesting Officer     Commissioner of Patents and Trademarks